United States Patent Office 3,274,111

Patented Sept. 20, 1966

3,274,111
MAGNETIC RECORDING MEDIUM WITH SELF-CONTAINED LUBRICANT

Tomohiko Sada, Nakano-ku, Tokyo, and Minoru Nishida, Ichikawashi, Chiba-ken, Japan, assignors to Sony Corporation, Shingawaku, Tokyo, Japan, a corporation of Japan No Drawing. Filed Sept. 5, 1963, Ser. No. 306,687
Claims priority, application Japan, Sept. 17, 1962, 37/40,269
6 Claims. (Cl. 252—62.5)

This invention relates to magnetic recording media, more particularly, to a magnetic composition for use in producing magnetic recording media suitable for use in video recording.

In a magnetic video tape recording apparatus (VTR) the relative velocity between the magnetic medium and the magnetic head is extremely high, such for example, about 1500 inches per second (38 meters per second) with the result that the abrasion and life of the tape and the abrasion of the magnetic head are problems of prime importance.

In order to solve these problems, various lubricated magnetic compositions for recording media such as tapes, have recently been proposed, but an entirely satisfactory one has not yet been developed.

It is an object of this invention to provide a self-lubricating magnetic composition for use in the production of recording media having a high degree of abrasion resistance and a long life.

Another object of this invention is to provide a composition for use in the production of magnetic media for magnetic video tape recording use having high sensitivity and excellent frequency characteristics.

Accordingly, there is provided in accordance with this invention, a fatty acid ester or mixture of fatty acid esters utilizable as lubricants in magnetic compositions. Such esters are produced by reaction between a pure monobasic fatty acid or a mixture of two or more monobasic fatty acids containing from about 12 to about 16 carbon atoms and a monohydroxy aliphatic alcohol with from about three to twelve carbon atoms. Preferably, the reactants are saturated, but when esters are prepared from mixtures especially mixtures of fatty acids, a degree of unsaturation in the mixture up to an iodine value of ten can be tolerated without appreciable adverse effects.

The lubricant is mixed with a powdered magnetic material such as gamma-iron oxide or an iron-cobalt-nickel composition in an amount which may vary from about 0.1 to 20 parts of lubricant per 100 parts of magnetic material. The mixture will also contain an adhesive binder. Any of the usual binder materials usually employed in the production of recording media can be used and in generally the same proportions. Polyvinyl chloride, polyvinyl acetate, polyacrylic esters, such as polybutyl acrylate and copolymers containing vinyl chloride, vinyl acetate or butyl acrylate as well as various polyurethanes may be mentioned by way of example. Mixtures of two or more binders are also useful.

In use, the composition is taken up in a liquid carrier to form a dispersion which is coated on a non-magnetic base such as a plastic tape. Evaporation of the liquid carrier deposits the magnetic composition with the magnetic particles and lubricant dispersed throughout the binder on the non-magnetic base as a thin layer, for example, up to about ten microns in width to provide a magnetic recording medium having high abrasion resistance and long life.

The lubricants of this invention are solids having a melting point up to about 40° C. Usually, with lubricants of comparatively lower melting points relatively greater amounts are used in preparing the magnetic compositions. For example, with butyl laurate which melts at 6° C. as much as 20 parts lubricant per 100 parts magnetic powder can be successfully used. With higher melting lubricants, e.g. a lubricant melting at about 25° C., it is preferred to use about 10 parts of lubricant per 100 parts of powder.

If too much lubricant is used, the composition may tend to break away from the non-magnetic base. Furthermore, with relatively larger amounts of lubricant in those cases where the recording media is used at lower ambient temperatures, there occurs the so-called blooming phenomenon in which the surface of the magnetic layer becomes rough and uneven and the magnetic powder sticks to the magnetic head with the result that sensitivity is low. If too little is used, the result is substantially the same as if no lubrican at all were used.

Any of a number of relatively volatile liquid carriers may be employed in using the compositions of this invention. Both aliphatic and aromatic liquids are suitable. Hydrocarbons such as toluene and oxygenated aliphatic liquids especially ketones such as methyl ethyl ketone are suitable.

The following non-limiting examples are given by way of illustration only.

*Example I*

A composition is prepared by mixing 40 g. of butyl laurate with 200 g. of powdered acicular magnetic gamma-iron oxide and 60 g. of a mixture of a polyurethane and a vinyl chloride-vinyl acetate copolymer. It is taken up in 250 g. of methyl ethyl ketone to form a dispersion which is coated on a polyester film base. Evaporation of the liquid produces a magnetic recording tape in which the magnetic composition is deposited on the surface of the non-magnetic base.

Tapes prepared in accordance with this example are compared with standard tapes similarly prepared by repeatedly scanning one portion of each tape at similar rates with a magnetic head to produce a picture and measuring the time intervals until the picture produced by each of the respective tapes begins to deteriorate. This is a standard test often employed to test the quality of magnetic recording tapes. With tapes containing known lubricants such as silicone oil, graphite, molybdenum disulfide and the like, deterioration is generally observed within 30 to 60 seconds. If no lubricant is used, deterioration is observed within a few seconds. With tapes of this example, there is no observable deterioration for 1,000 seconds or even longer. Moreover, the amount of wear on the tape itself is less than one-tenth of that observed with previously known tapes and the abrasion of the magnetic head only about one-sixth of that observed with previously known tapes.

*Example II*

A composition similar to that of Example I but containing only 0.1% by weight of the lubricant based on the amount of magnetic powder is used to prepare a magnetic recording tape. The deterioration time as measured using the procedure of Example I is 60 seconds and the abrasion of the magnetic head only about one-fifth of the amount observed with previously known tapes.

*Example III*

An ester is prepared from lauryl alcohol and a fatty acid mixture of palmitic acid containing a sufficient amount of unsaturated compounds to give the mixture an iodine value of ten. This ester is used to prepare a magnetic composition containing 20 g. of ester, 50 g. of the binder of Example I and 200 g. of a powdered magnetic mixture containing 48% iron, 50% cobalt and 2% nickel. The mixture is taken up in 250 g. toluene and the suspension is coated on a tape base. The liquid is evaporated to provide a magnetic recording tape having substantially the same favorable properties of the novel tapes of the previous examples.

*Example IV*

Tapes are prepared using compositions containing 40, 20 and 2 g. respectively of a mixture of propyl laurate and butyl myristate, 200 g. of gamma-iron oxide and 40 g. of polyvinyl chloride binder. Methyl ethyl ketone (250 g.) is used as the liquid carrier with each composition. The deterioration times are 1,000 seconds for the composition containing 40 g. of lubricant, 180 seconds for the one containing 10 g. of lubricant and 200 seconds for the 2 g. composition.

*Example V*

Tapes are prepared using compositions containing 4, 8, 20, 40 and 80 g. respectively of isobutyl myristate, 400 g. of gamma-iron oxide and 100 g. of the binder of Example I. Methyl ethyl ketone (500 g.) is used as the liquid carrier. The results obtained with respect to deterioration time, tape wear and abrasion resistance of the head are substantially the same as with the tapes of the previous examples. Similar results are obtained with other magnetic compositions prepared using dodecyl myristate.

The lubricants used in preparing the compositions of this invention are readily dispersed in the usual binders such as those mentioned above without adversely affecting the mechanical strength and other properties of the binder.

As illustrated above, the magnetic recording media of this invention do not abrade the magnetic head to the extent observed with previously known recording media.

In the past, it has been necessary to select high melting binder materials to increase the abrasion resistance and, therefore, the lifetime of the tape. With the lubricants of this invention, lower melting binder materials can be used with little or no loss in the quality of the recording media especially with respect to frequency characteristics and high sensitivity.

It will be apparent that many modifications and variations may be effected without departing from the spirit and scope of this invention.

What is claimed is:

1. A magnetic composition for use in magnetic recording media, said composition consisting essentially of a powdered magnetic material and a binder together with from about 0.1 to about 20 parts per 100 parts of magnetic material of a fatty acid ester produced from a monohydroxy alcohol containing from 3 to 12 carbon atoms and at least one saturated monobasic fatty acid containing from 12 to 16 carbon atoms.

2. A magentic composition for use in magnetic recording media, said composition consisting essentially of powdered gamma-iron oxide and a binder together with from about 0.1 to about 20 parts per 100 parts of gamma-iron oxide of a fatty acid ester produced from a monohydroxy alcohol containing from 3 to 12 carbon atoms and at least one saturated monobasic fatty acid containing from 12 to 16 carbon atoms.

3. A magnetic composition for use in magnetic recording media, said composition consisting essentially of a powdered magnetic mixture containing 48% iron, 50% cobalt and 2% nickel and a binder together with from about 0.1 to about 20 parts per 100 parts of said magnetic material of a fatty acid ester produced from a monohydroxy alcohol containing from 3 to 12 carbon atoms and at least one saturated monobasic fatty acid containing from 12 to 16 carbon atoms.

4. A magnetic recording medium comprising a non-magnetic base coated with a magnetic composition consisting essentially of a powdered magnetic material and a binder together with from about 0.1 to about 20 parts per 100 parts of magnetic material of a fatty acid ester produced from a monohydroxy alcohol containing from 3 to 12 carbon atoms and at least one saturated monobasic acid containing from 12 to 16 carbon atoms.

5. A magnetic recording medium comprising a non-magnetic base coated with a magnetic composition consisting essentially of powdered gamma-iron oxide and a binder together with from about 0.1 to about 20 parts per 100 parts of gamma-iron oxide of a fatty acid ester produced from a monohydroxy alcohol containing from 3 to 12 carbon atoms and at least one saturated monobasic fatty acid containing from 12 to 16 carbon atoms.

6. A magnetic recording medium comprising a non-magnetic base coated with a magnetic composition consisting essentially of a powdered magnetic mixture containing 48% iron, 50% cobalt and 2% nickel and a binder together with from about 0.1 to about 20 parts per 100 parts of said magnetic material of a fatty acid ester produced from a monohydroxy alcohol containing from 3 to 12 carbon atoms and at least one saturated monobasic fatty acid containing from 12 to 16 carbon atoms.

References Cited by the Examiner

UNITED STATES PATENTS

| | | | |
|---|---|---|---|
| 2,654,681 | 10/1953 | Lueck | 252—62.5 |
| 2,775,566 | 12/1956 | Crowley | 252—62.5 |
| 2,804,401 | 8/1957 | Cousino | 252—62.5 |
| 2,954,552 | 9/1960 | Halpern. | |
| 3,029,157 | 4/1962 | Sutheim et al. | |

TOBIAS E. LEVOW, *Primary Examiner.*

ROBERT EDMONDS, *Assistant Examiner.*